United States Patent Office 3,578,664
Patented May 11, 1971

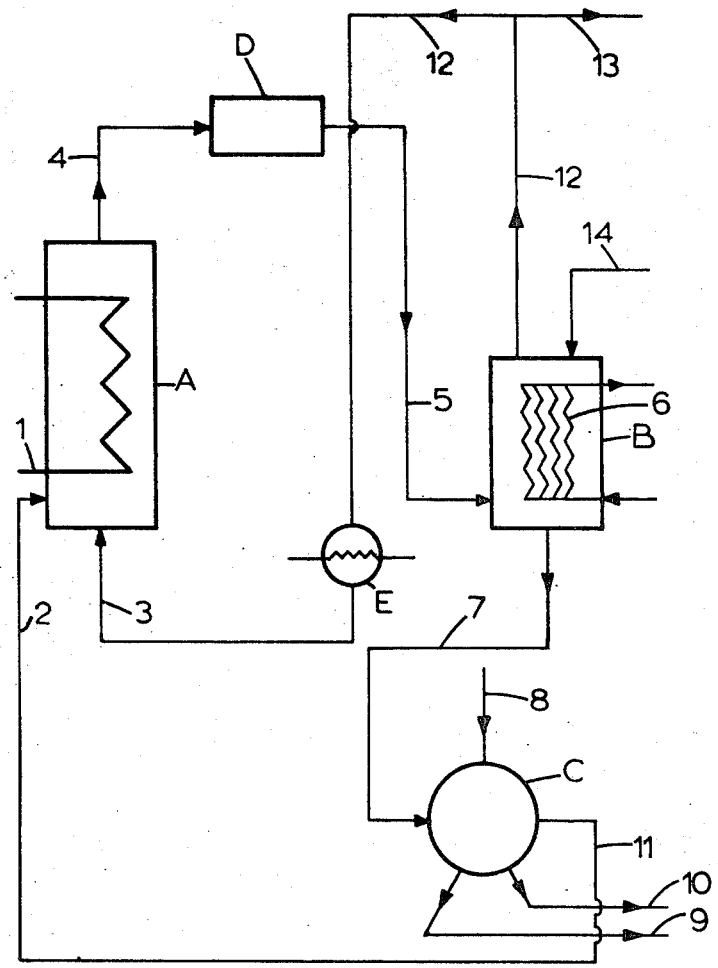

3,578,664
PROCESS FOR THE RECOVERY OF MELAMINE FROM A SYNTHESIS GAS MIXTURE CONTAINING HOT MELAMINE VAPOUR
Petrus J. C. Kaasenbrood, Sittard, Netherlands, assignor to Stamicarbon N.V., Heerlen, Netherlands
Filed June 30, 1969, Ser. No. 837,479
Claims priority, application Netherlands, June 29, 1968, 6809253
Int. Cl. C07d 55/24
U.S. Cl. 260—249.7                4 Claims

ABSTRACT OF THE DISCLOSURE

A process for the recovery of melamine from a synthesis gas mixture containing hot melamine vapor, in which process the still hot gas mixture obtained from the melamine synthesis is cooled by contacting it with a liquid coolant, which is a urea melt, thereby yielding a suspension of melamine in the liquid coolant from which the melamine is subsequently separated.

---

The invention relates to a process for the recovery of melamine from a synthesis gas mixture containing hot melamine vapor. Such a gas mixture is obtained in the preparation of melamine from urea, in which process urea is transformed by heating, whether or not under pressure, into a gas mixture containing melamine, ammonia and carbon dioxide according to the reaction equation:

$$6CO(NH_2)_2 \rightarrow C_3N_6H_6 + 6NH_3 + 3CO_2$$

Since the reaction is usually carried out in the presence of a catalyst and a current of gas containing ammonia, the synthesis gas will as a rule contain more ammonia than would be indicated by the stoichiometry of the above reaction equation.

Upon cooling of the hot reaction gases, the melamine can be recovered in solid form from the remaining gases by sublimation. The reaction gases may be cooled by bringing the hot gases into contact with a gaseous, liquid or solid coolant, however, all of these methods have disadvantages which disadvantages are overcome by the process of the present invention.

The use of a gaseous coolant has the drawback that large gas volumes have to be recycled. This method is also disadvantageous from the heat-economy point of view, because a large part of the heat to be withdrawn is released at so low a level that it is difficult to use the heat, for example, by heat exchange in the reaction.

As regards liquid coolants, the use of an inert liquid e.g. a high-boiling hydrocarbon, has the disadvantage that the sublimated melamine must be freed of adhering hydrocarbon after filtration by means of special solvents.

If water or a solution of ammonium carbonate is used as the coolant, the gases freed of the melamine will contain much water vapor, which renders them unfit for immediate recirculation to the melamine synthesis reactor; if said gases are used in other processes, e.g. in the preparation of urea from $NH_3$ and $CO_2$, the water contained in the gases has an unfavorable effect on the reaction and the product.

The use of a solid coolant consisting of melamine particles forming a fluid bed has the disadvantage that a relatively large fluid bed has to be maintained which is very costly. Further, the heat-removing surface on which the sublimating melamine is deposited is not easy to keep clean.

The invention of this application relates to a process in which the drawbacks inherent in the separation techniques described above are obviated.

According to the invention the melamine is recovered from the hot synthesis gases by contacting the hot gases with molten urea, and removing the melamine that has become suspended in the urea melt. The gases, substantially freed of melamine are also removed. The melamine suspension in the urea melt must possess good flow properties to remain pumpable, therefore the viscosity of the suspension must be prevented from becoming too great. Therefore, the melamine content of the suspension should not exceed 50% by weight. On the other hand, the amount of melamine in the urea melt must not be too low, or the subsequent recovery will not be economical. The concentration of melamine in the melt should be at least about 5% preferably 10 to 30% by weight.

The melamine can be separated from the urea by filtration or centrifuging, with or without previous thickening of the suspension, e.g. in a cyclone, after which the melamine can be washed free of urea with water. The resulting small amount of dilute urea solution is evaporated to a melt and recycled.

Preferably, the melamine-containing gases are brought into contact with a urea melt, at a temperature of the melt of at least about 150° C. Although a lower temperature may be used, a temperature of 150° C. or higher has the advantage that the heat to be carried away is at a higher temperature level, and can therefore be utilized for production of useful steam.

The hot melamine-containing gases may be contacted with the urea melt, for example in a parallel tubular condenser, in which the water to be transformed into steam is passed around the tubes and the urea melt along the inner walls thereof in concurrent or counter-current relation to the hot melamine-containing gases. The gases may also be led through the urea melt in a vertical cylinder provided with blades, in which case the heat set free is transferred to a cooling-tube system surrounded by the urea melt.

Adsorption of the heat set free in the condensation of melamine calls for a quantity by weight of urea melt that is fairly large compared with the quantity of melamine to be condensed, because, if said quantity should be taken smaller, the temperature of the urea melt would increase to an inadmissibly high level owing to the formation of by-products and decomposition products such as cyanuric acid, melamine cyanurate and ureidomelamine.

In order that the temperature can be controlled, the weight ratios between melamine and urea during the condensation are chosen between, say, 1:40 and 1:100, while it is preferred to recycle the urea melt between a zone where the condensation of the melamine is effected and a zone where the urea melt releases the absorbed heat with simultaneous formation of steam.

The recovery of melamine by means of a urea melt has the further advantage that small quantities of by-products which also sublimate from the gas flow, such as ammeline and ammelide dissolve in the urea melt, so that a very pure melamine is obtained.

A further advantage of the process according to the invention is that the molten urea, after having been used as the coolant, may be fed to the melamine reactor. The impurities dissolved in the urea do not interfere with the reaction because these also take part in the conversion processes in the melamine reactor. The process also has the advantage that the reaction gases are water-free, so that they may, for example, be compressed at the lowest possible temperature and be recycled to the urea synthesis. As a result, the corrosive attack on the compressor, and also the compression costs, are minimum.

The process according to the invention will now be described with reference to the drawing, in which the course of the process and the necessary equipment is illustrated. In this figure a melamine reactor A which is filled with catalyst particles, is kept at the required temperature by heating coil 1, and receives molten urea along line 2 and fluidization gas via line 3. The synthesis gases, at a temperature of 390° C., are withdrawn from the reactor along line 4. In filter unit D they are freed of catalyst dust, whereafter they travel along line 5 to sublimator B, to be contacted with a urea melt. The sensible heat and the released heat of sublimation are disposed of by heat exchange with water, which, flowing through cooling tube system 6, is thus transformed into steam.

Urea, either in solid or in molten form, is continuously fed to sublimator B along line 14.

The resulting suspension of melamine in the urea melt flows along line 7 to centrifuge C, which receives washing water from line 8. The washed melamine crystals are discharged along line 9, the urea solution obtained from the washing process being carried away along line 10.

The urea melt freed of melamine is recycled to the melamine synthesis reactor via line 11 and line 2.

The bulk of the melamine-free gases is recycled to the melamine synthesis reactor along line 12 and through heater E. The gases obtained from the synthesis may also be subjected to a precooling treatment by mixing a portion of the relatively cold melamine-free gases with the hot gases obtained from the synthesis.

An amount of gas corresponding to the amount of gas formed in the melamine production is carried away along line 13; this gas may be used in other reactions, for example it may be supplied to a urea synthesis unit.

The reaction according to the invention can be carried out either under atmospheric pressure and under superatmospheric pressure. The choice between these two alternatives depends on the conditions under which the melamine synthesis takes place.

The invention is illustrated by following example:

EXAMPLE

A urea melt feed at a temperature of 160° C. was introduced at a rate of 100 kg./hour into a melamine synthesis reactor operated at 390° C. and 7 atm.

150.5 m.$^3$ (n.t.p.) of a gas mixture, consisting of 2 parts by volume of $NH_3$ and 1 part by volume of $CO_2$, was used as the fluidization gas. Silica gel was used as the catalyst.

The composition of the reaction gases is as follows:

31.5 kgs. of melamine
7.2 kgs. of HNCO
105.3 kgs. of $NH_3$
133.0 kgs. of $CO_2$ In the sublimator to which 103.5 kg./hour make-up urea was added, these reaction gases were brought into contact with 4000 kgs. of urea melt circulating through the sublimator; resulting melamine suspension, having a temperature of 170° C. was centrifuged, which yielded 31 kgs. of melamine.

At the same time 7.4 kgs. of urea solution with a concentration of 46% by weight were obtained by washing of the melamine crystals.

75% of the gas flow issuing from the sublimator was recycled to the melamine synthesis reactor, the remainder was fed to a urea plant.

An amount of heat equal to 36000 kcals. per hour was withdrawn from the sublimator in the form of steam at 4.5 atm. pressure.

The production of melamine was 90% of theoretical, based on the urea input.

It will be evident that the urea melt to be used need not be totally pure and may contain decomposition products, such as biuret, because these do not interfere with the melamine synthesis.

What is claimed is:

1. A process for the recovery of melamine from a hot synthesis gas mixture containing melamine vapor, comprising the steps of cooling the hot gas mixture obtained from the melamine synthesis by contacting said gas mixture with a urea melt as liquid coolant, thereby forming a suspension of melamine in the liquid coolant, and subsequently separating the melamine from the coolant.

2. A process as claimed in claim 1, in which the urea melt has a temperature of at least 150° C.

3. A process as claimed in claim 1, in which the suspension of melamine in urea contains 5-50% by weight of melamine.

4. A process as claimed in claim 1, in which, after separation of the suspended melamine, the urea melt is recycled to the melamine synthesis.

References Cited

UNITED STATES PATENTS

| | | | |
|---|---|---|---|
| 2,776,285 | 1/1957 | Dyer | 260—249.7 |
| 3,458,511 | 7/1969 | Hamprecht et al. | 260—249.7 |
| 3,503,970 | 3/1970 | Kanai et al. | 260—249.7 |

JOHN M. FORD, Primary Examiner